US011451930B2

(12) United States Patent
Saha et al.

(10) Patent No.: US 11,451,930 B2
(45) Date of Patent: Sep. 20, 2022

(54) DYNAMIC HOTSPOT PREDICTION METHOD AND SYSTEM (71) Applicant: CONDUENT BUSINESS SERVICES, LLC, Florham Park, NJ (US)

(72) Inventors: Saikat Saha, Bangalore (IN); Prakash Chandra, Vaishali (IN); Sumit Das, Bangalore (IN); Bindusree Yadamakanti, Bangalore (IN); Vinuta Gayatri, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 0 days.

(21) Appl. No.: 17/071,192

(22) Filed: Oct. 15, 2020

(65) Prior Publication Data

US 2022/0124455 A1 Apr. 21, 2022

(51) Int. Cl.
*H04W 4/029* (2018.01)
*G06N 7/00* (2006.01)
*G06F 3/0481* (2022.01)
*G06F 16/29* (2019.01)

(52) U.S. Cl.
CPC .......... *H04W 4/029* (2018.02); *G06F 3/0481* (2013.01); *G06F 16/29* (2019.01); *G06N 7/005* (2013.01)

(58) Field of Classification Search
CPC ............ H04W 4/029; G06F 16/29; G06F 3/0481–0483; G06F 16/168; G06F 16/248; G06F 16/26; G06F 16/287; G06F 16/3323; G06F 16/3328; G06F 16/338; G06F 16/358; G06F 16/34; G06F 16/90328; G06F 16/9038; G06F 16/904; G06N 7/005; G06N 5/04–048; G06Q 10/04–047
See application file for complete search history.

(56) References Cited

U.S. PATENT DOCUMENTS

| | | | |
|---|---|---|---|
| 8,290,705 B2 | 10/2012 | Trinko et al. | |
| 9,129,219 B1* | 9/2015 | Robertson | G06N 5/048 |
| 9,836,694 B2 | 12/2017 | Robertson et al. | |
| 10,810,280 B2* | 10/2020 | Bondareva | G06Q 50/265 |

(Continued)

FOREIGN PATENT DOCUMENTS

WO 2019/088971 A1 5/2019

OTHER PUBLICATIONS

Holm, Noah, and Emil Plynning. "Spatio-temporal prediction of residential burglaries using convolutional LSTM neural networks." (2018). (Year: 2018).*

(Continued)

*Primary Examiner* — Liang Y Li
(74) *Attorney, Agent, or Firm* — Jones Robb, PLLC (57) ABSTRACT

A method and system is presented for dynamically predicting hotspots (predictive of a high volume of event occurrences) in a geographic location. The method calculates a hotspot probability measure for each grid within this geographic location by summing probability of predicted volume bucket with probabilities of all higher buckets (buckets are ordinal here). The method also calculates a hotspot score for each grid based on the corresponding hotspot probability measure, selects a pre-defined number of grids having the highest hotspot scores as predicted hotspots, and generates an alert indicating the predicted hotspots and displaying the alert on a predictive GUI, showing the multiple grids.

20 Claims, 7 Drawing Sheets

(56) References Cited

U.S. PATENT DOCUMENTS

| | | | |
|---|---|---|---|
| 11,049,298 B2* | 6/2021 | Waniguchi | G08B 25/14 |
| 11,221,410 B2* | 1/2022 | Ikuta | G01S 17/10 |
| 2016/0036974 A1* | 2/2016 | Strom | H04M 3/5116 |
| | | | 455/404.1 |
| 2016/0189043 A1 | 6/2016 | McGeever et al. | |

OTHER PUBLICATIONS

Buckler, Craig. "What is a REST API". Sitepoint. Feb. 5, 2020. <https://www.sitepoint.com/rest-api/> (Year: 2020).*

Getz, Adam. "Three Steps in ETL processing", bi-insider.com. May 27, 2011 (Year: 2011).*

* cited by examiner

DYNAMIC HOTSPOT PREDICTION METHOD AND SYSTEM

FIELD OF THE INVENTION

Embodiments relate generally to dynamically predicting hotspots or geographical locations with a high volume of occurrence of an event. In particular embodiments, systems and methods predict a high volume of crime events.

TECHNICAL BACKGROUND

Occurrences of crime events are a significant source of concern in major modern societies. The impact of such crimes is not only restricted to safety of the communities and thus quality of life, but can also be felt on e.g., property values, area developments and tourism, etc. Naturally, the ability to prevent or mitigate such crimes is of utmost importance for the law enforcement agencies (LEA). Towards this end, crime prediction has become an area of significant research interest in recent years. The research is mainly fueled by the ever-increasing ability of states and organizations to collect and store crime events data.

Extensive criminal justice research suggests that targeting specific highly concentrated crime occurring areas within a given region of interest (e.g., county, municipality or city), called the "hotspots" is an effective policing strategy. With a reliable predictive model for hotspots, LEA would be able to allocate their resources far more effectively to prevent or respond quickly to criminal activities. Existing models are available that predict hotspots based on crime volume.

However, existing predictive models suffer from various deficiencies. For example, existing predictive models are not robust and have been known to generate a high number of false positive hotspot indications. Further, existing models often fail to predict areas of high crime volume. Accordingly, resources are wasted when they are deployed to areas with little need and areas with the need for resources fail to receive them. Accordingly, a more accurate predictive model is needed in order to ensure proper resource allocation.

Overview

In an embodiment, a method is provided for dynamically predicting hotspots exhibiting a high volume of crime occurrences in a geographic location. The method includes implementing a server including at least one processor for performing multiple steps. The steps include collecting raw occurrence data representing crime occurrences within a preselected geographical area and performing spatial aggregation to map the collected raw occurrence data to multiple grids within the pre-selected geographical area. The steps additionally include deriving aggregated data over a time period for the grids based on the mapped raw occurrence data, the aggregated data including an aggregated crime count. The method includes building a data driven volume predictive model, where the volume is grouped into a number of pre-defined buckets (i.e., volume data is sorted into a number of classes or buckets by range) & for each grid, the predictive volume is chosen as the bucket with the highest probability. An additional step includes calculating a hotspot probability measure for each grid by summing probability of predicted bucket with probabilities of all higher buckets (buckets are ordinal). The method further calculates a hotspot score for each grid based on the corresponding hotspot probability measure & predicted bucket weight. The method steps additionally include selecting N number of grids (where N is predetermined) having the highest hotspot score as predicted hotspot; and generating an alert indicating the predicted hotspots and displaying the alert on a predictive GUI showing the multiple grids.

In a further embodiment, a system is provided for dynamically identifying hotspots predictive of an event in a geographic location. The system includes a communication interface configured to collect raw occurrence data from a remote database, for example using Extract, Transform & Load (ETL) steps. The system further includes a server including at least one processor and a memory storing instructions for execution by the processor for performing multiple steps. The steps include performing spatial aggregation to map the collected raw occurrence data to multiple grids within the pre-selected geographical area and deriving aggregated data over a time period for the grids based on the mapped raw occurrence data. The derived aggregated data includes an aggregated event count. The step further includes building a data driven volume predictive model, where the volume is grouped into a number of pre-defined buckets (i.e., volume data is sorted into a number of classes or buckets by range) & for each grid, the predictive volume is chosen as the bucket with the highest probability. The processor additionally calculates a hotspot probability measure for each grid by summing probability of predicted bucket with probabilities of all higher buckets (buckets are ordinal) and calculates a hotspot score for each grid based on the corresponding hotspot probability measure & predicted bucket weight. The process additionally includes selecting N number of grids (where N is predetermined) having the highest hotspot score as predicted hotspot; and generating an alert indicating the predicted hotspots and displaying the alert on a predictive GUI showing the multiple grids.

In a further embodiment, a non-transitory computer readable medium storing instructions for execution by a processor is provided, wherein the instructions upon execution cause the processor to perform multiple steps. In various disclosed embodiments, the processor performs the method steps as explained above. Additionally, in embodiments, the processor calculates the hotspot score by summing a predicted bucket weight with the hotspot probability score. The number of grids predicted as hotspots is a pre-selected number N. The processor sorts the scored grids in descending order and selects the top N grids as predicted hotspots.

In each of the described embodiments a larger or smaller number of steps may be included and may be performed in an alternative order. Additional embodiments may variously combine steps of the disclosed embodiments.

BRIEF DESCRIPTION OF THE DRAWINGS

The accompanying drawings illustrate various embodiments of systems, methods and various other aspects. Any person with ordinary skill in the art will appreciate that the illustrated element boundaries (e.g., boxes, groups of boxes, or other shapes) in the figures represent one example of the boundaries. In a few examples, one element may be designed as multiple elements or multiple elements may be designed as one element. In a few examples, an element shown as an internal component of one element may be implemented as an external component in another, and vice versa. Furthermore, elements may not be drawn to scale. Various embodiments will hereinafter be described in accordance with the appended drawings, which are provided to illustrate, and not to limit, the scope in any manner, wherein like designations denote similar elements.

DETAILED DESCRIPTION

In an embodiment, data is gathered from a database storing event data pertinent to multiple locations. The data relates to the occurrence of an event and should include at least a time stamp, event ID and an address stamp. The data points are aggregated and then analyzed to predict event volume in a future time period so that resources can be efficiently allocated in a particular geographical area. In embodiments, the prediction of event volume relates to the prediction of crime volume in predefined geographical locations. In alternative embodiments, the predictive power may be applied to traffic or other transportation related environments including accident prediction, parking availability or parking violation citations, or other logistical environments.

Figure 1:
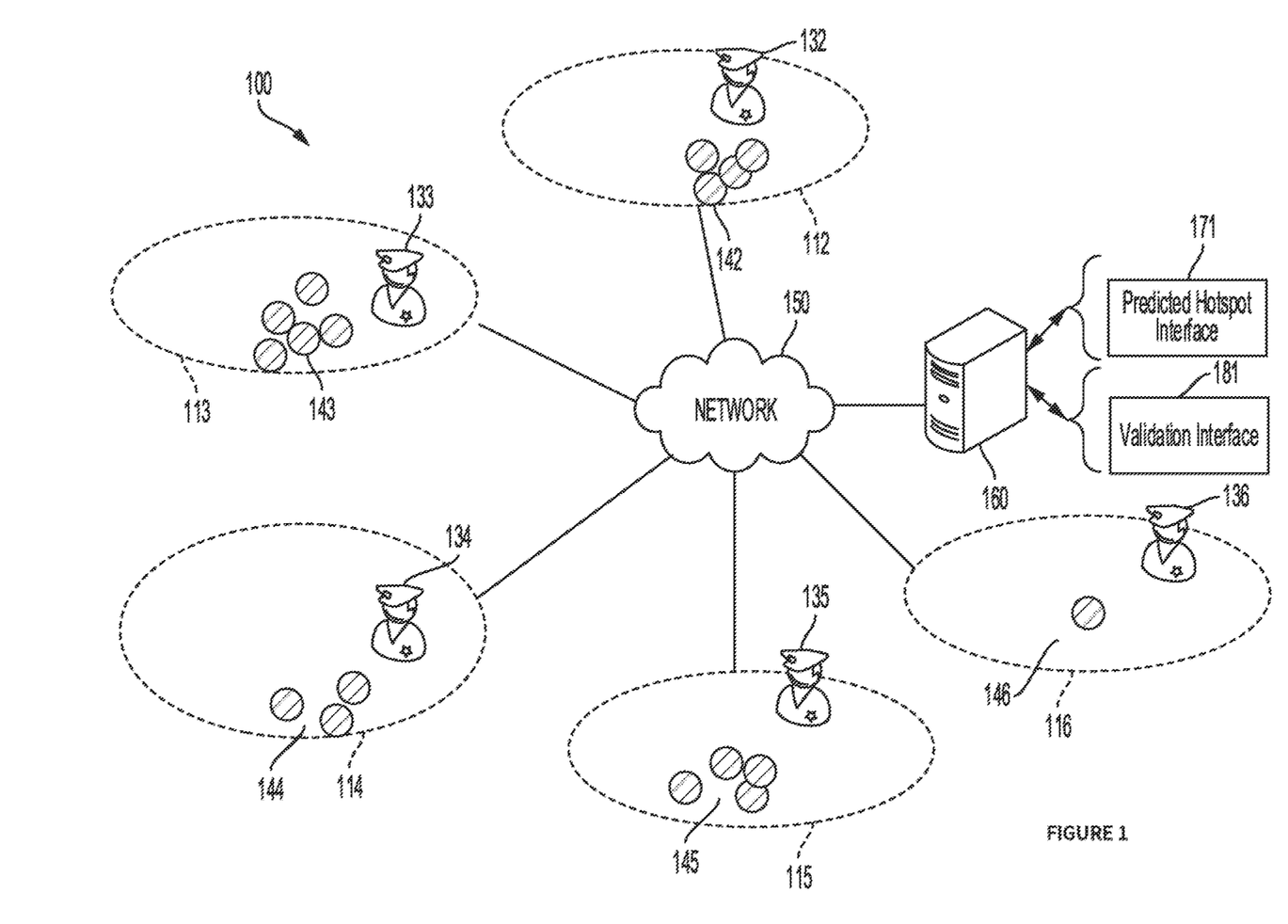
FIG. 1 is a diagram illustrating a hotspot prediction environment.

FIG. 1 is a diagram illustrating a crime hotspot prediction environment. In FIG. 1, geographical regions 112-116 are illustrated. Geographical regions may correspond to, for example, one or more of the coverage area of a law enforcement agency (LEA), a county, a city, township, city block, and/or an arbitrarily selected area (e.g., a grid unit). Each geographical region 112-116 is policed by one or more law enforcement agencies 132-136. These law enforcement agencies 132-136 create, track, and maintain information about crimes that occur within their respective geographical regions 112-116. This crime information generated by law enforcement agencies 132-136 may be gathered and processed such that it is expressed as one or more data points 142-146 that are associated with respective geographical regions 112-116. In other words, the crime information generated by law enforcement agencies contains multiple data points. Each data point includes a crime ID, a time stamp, and a location stamp. Additional metadata may be included.

The data points 142-146 may be gathered by, or pushed to, the crime hotspot prediction system 160 via a network 150 (e.g., the internet). The network 150 may include a wired or wireless local area network (LAN) and a wide area network (WAN), wireless personal area network (PAN), a cellular telephone network and other types of networks. Although only one network is shown, the computers may be connected over multiple disparate networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Based on these collected data points, the crime hotspot prediction system 160 may dynamically predict crime hotspots indicative of a high volume of crime and output predicted hotspots on predicted hotspot interface 171. As will be set forth further below, the geographical area may be divided into a series of grids for purposes of prediction. The crime hotspot prediction system 160 also formulates and outputs a validation interface comparing hotspot predictions to actual results in the event actual results are available.

Figure 2:
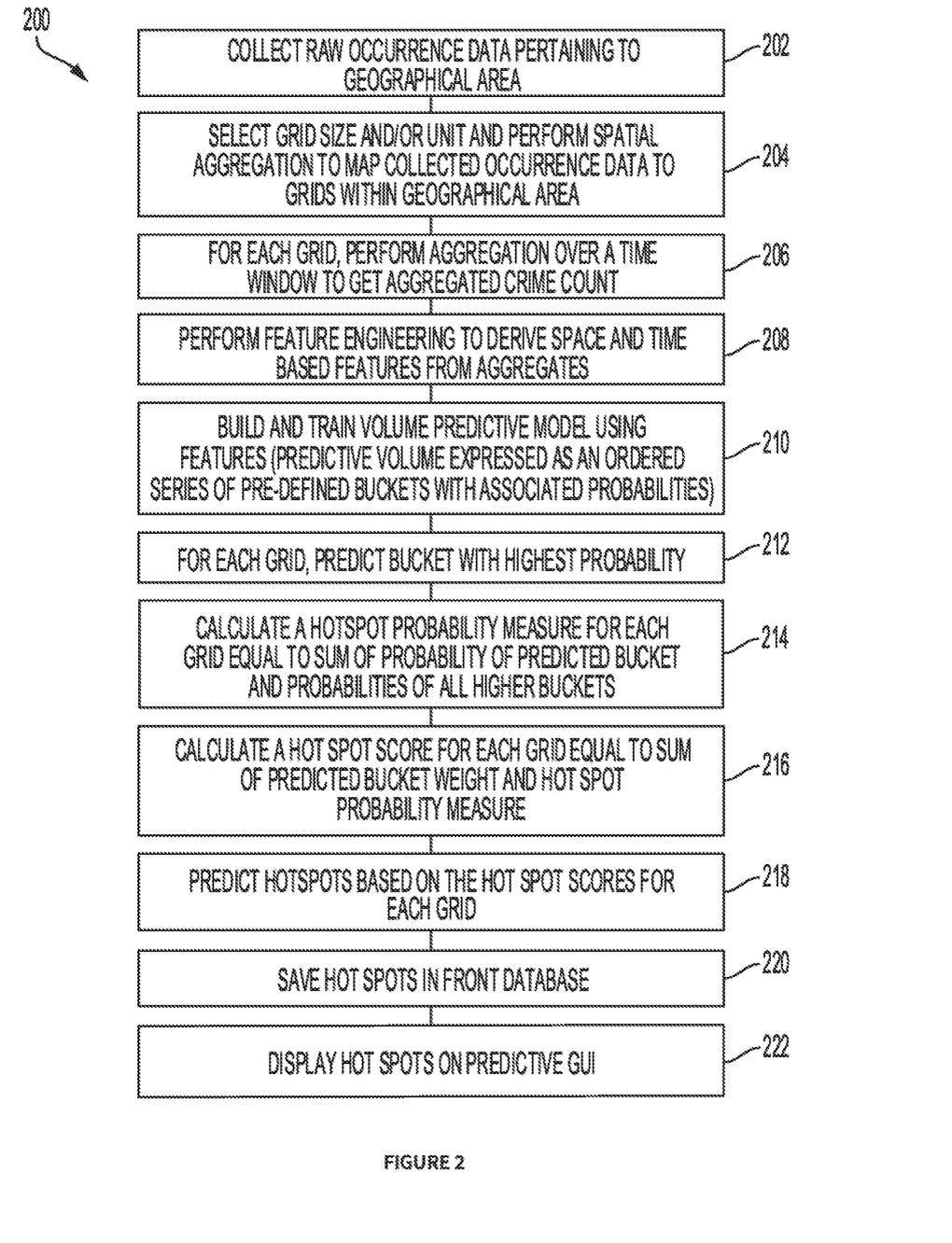
FIG. 2 is a flowchart illustrating a method for hotspot prediction.

FIG. 2 is a flowchart illustrating a method for predicting hotspots in accordance with an embodiment. In step 202, the system collects raw occurrence data from a remote database further described in conjunction with FIG. 5 below. As set forth above, the raw occurrence data may simply include data points reflective of occurrence data from different geographical areas. For optimal inclusion, each data point should include at least an occurrence identifier, such as a crimeID, a timeID, and a locationID.

Figure 3:
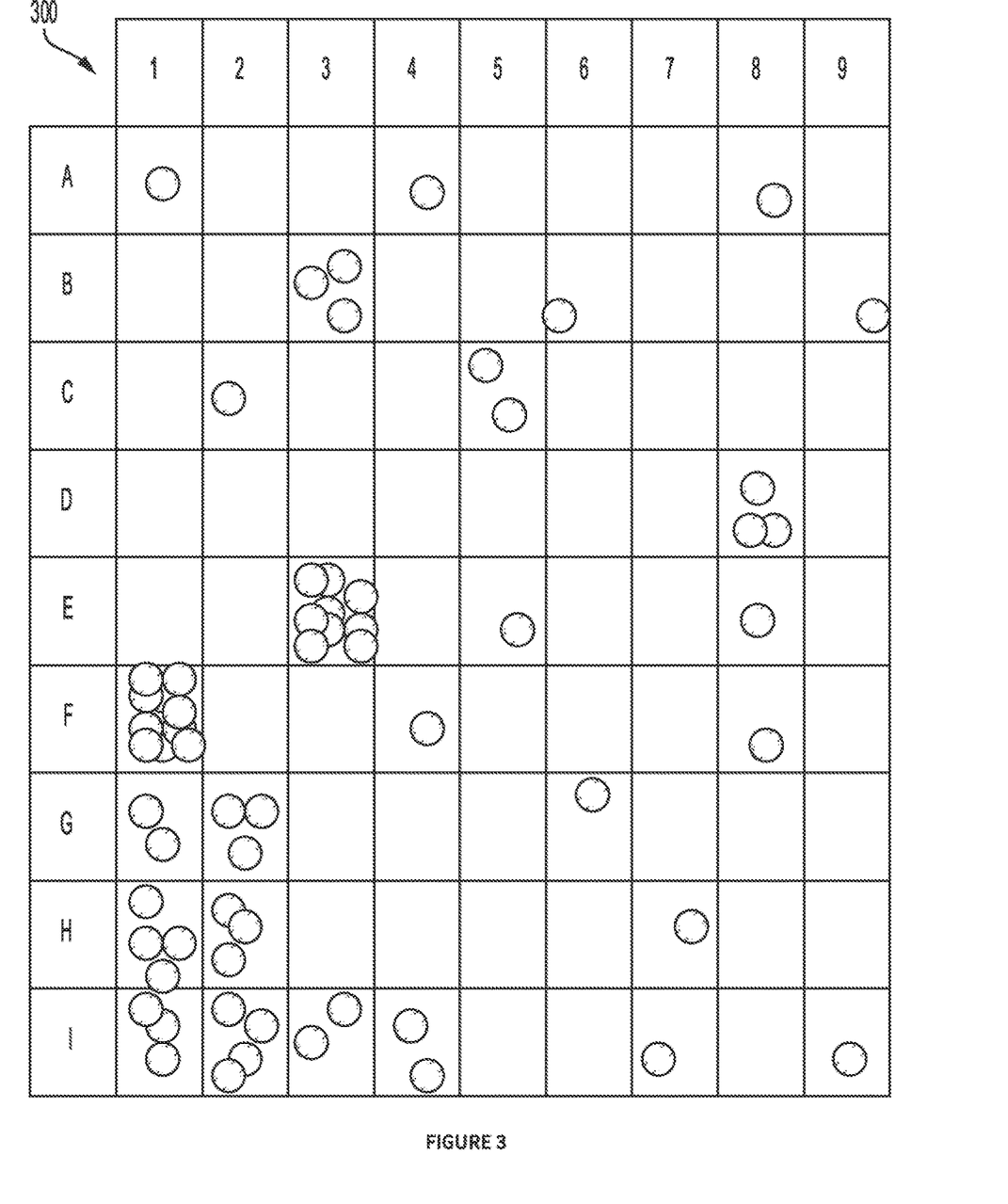
FIG. 3 is a diagram illustrating an aspect of the method for hotspot prediction.

In step 204, the system selects a grid size and unit (user input) and performs spatial aggregation to map collected occurrence data to grids within a geographical area. In order to accomplish this, the system divides the target area into a number of (regular) grids (spatial discretization) and subsequently maps the occurrence data to those grids. Referring to FIG. 3, a geographical area is shown divided into grids. The data points mapped to individual grid are then grouped by a particular time window, e.g., a week, a month, a quarter, a year, or any other time period. As shown in FIG. 3, for a particular time period, grids such as E3 and F1 show a larger number of event occurrences and grids such as D1 and D2 have no event occurrence.

In step 206, for each grid, the system performs aggregation over given time window to derive an aggregated crime count for every timeframe and in that way, converts the crime event data to crime count time series data at each grid level. As explained above, the time window may be, for example, one month, but other time periods are within the scope of the disclosed embodiments.

In step 208, the system performs feature engineering to derive space and time based features from the aggregates. In step 210, the system builds and trains a volume predictive model using the features as input, where the predictive volume is grouped into a number of pre-defined buckets (i.e., volume data is sorted into a number of classes or buckets by range). For example, a crime volume of 1-5 may correspond to Bucket 1; a crime volume of 6-12 may correspond to Bucket 2; a crime volume of 13-100 may correspond to Bucket 3; and so forth. Using bucket rather than an absolute number provides improved user experience and as such, it is envisaged here. The number of buckets is decided empirically from the distribution of the available data. Since the buckets follow a natural order based on their volume ranges (i.e., buckets are ordinal), bucket weight mapping can be accomplished by exploiting this order. For example, for the above 3 buckets, the weights can be defined as 1 for Bucket 1, 2 for Bucket 2 & 3 for Bucket 3.

In step 212, for each grid and a given time window, the volume is predicted as the bucket with the highest probability.

In step 214, the system calculates a predictive hotspot probability measure for each grid by summing probability of predicted bucket with probabilities of all higher buckets (i.e., buckets having higher predictive volume ranges). Thus, the system considers not only the predicted bucket and probability of belonging to that predicted bucket, but also the probabilities of the grid belonging to buckets with crime range or event occurrence volume greater than the predicted bucket. Thus, an algorithm for calculating a hotspot probability measure (Algorithm1) is as follows:

For i=1 to m (where m is a total number of grids):

hotspot probability measure (i)=sum (probability of
predicted bucket (i), probability of all higher
bucket(s) (i))      (1)

In step 216, the system calculates a hotspot score for each grid based on the corresponding hotspot probability measure. A sample algorithm for predicting the hotspot score (Algorithm2) is as follows:

For i=1 to m (where m is a total number of grids):

hotspot score (i)=sum (predicted bucket weight (i),
hotspot probability measure (i))      (2)

In step 218, the system predicts hotspots based on the hotspot scores for each grid. In order to facilitate hotspot score selection, the system may sort data in descending order of hotspot score and select top N rows (where N is a predefined number of hotspots) of data and return corresponding grids as hotspots. In step 220, the system saves predicted hotspot information in a front database. In step 222, the system displays hotspots on a predictive GUI.

Figure 4:
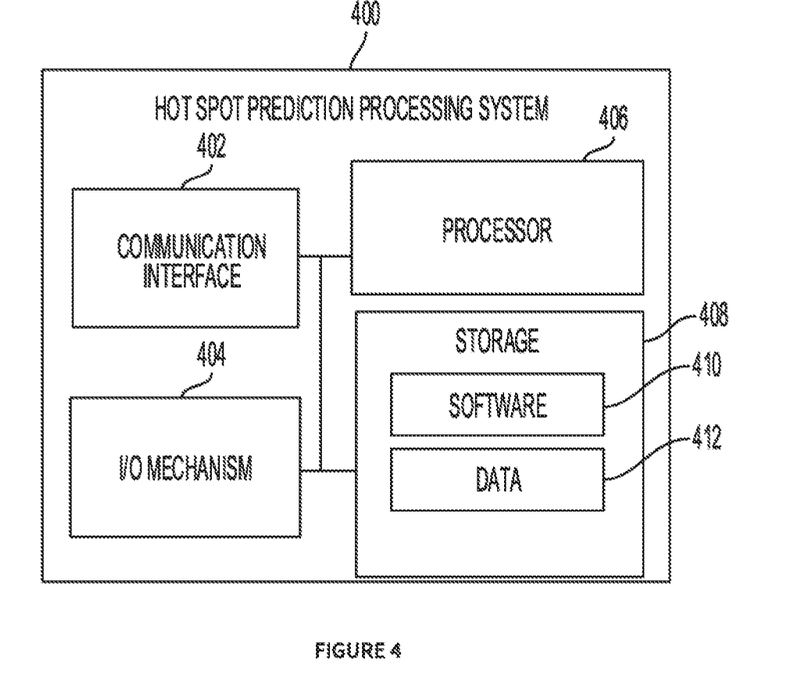
FIG. 4 is a block diagram illustrating a system for hotspot prediction in accordance with an embodiment.

FIG. 4 is a block diagram illustrating a hotspot prediction processing system 400 in accordance with an embodiment. The hotspot prediction processing system 400 may include a communication interface 402, an I/O mechanism 404, one or more processors 406, and storage area 408.

The one or more processors 406 can be utilized to implement multiple discrete software modules performing each of the functions described herein. Processors can be realized through a number of processor technologies known in the art. Examples of the processor can be an X86 processor, a RISC processor, an ASIC processor, a CISC processor, or any other processor. The processors are configured to execute sets of instructions stored in the storage area 408.

The storage area 408 can comprise a disk drive, flash drive, memory circuitry, or other memory device. The storage area 408 is configured to store the sets of instructions or modules. Some of the commonly known memory implementations can be, but are not limited to, a Random-Access Memory (RAM), a Read-Only Memory (ROM), a Hard Disk Drive (HDD), and a secure digital (SD) card.

The storage area 408 may include software 410 such as a program module and data 412 such as program data. The program module includes a set of instructions that can be executed by the processors to perform specific actions. The data may be stored in various databases present in the storage area 408 that are accessible to the processors executing the stored programs. Databases stored in the storage area 408 can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system.

Software 410 may include computer programs, firmware, or some other form of machine-readable instructions, including an operating system, utilities, drivers, network interfaces, applications, or some other type of software. The processor 406 may include a microprocessor and/or other circuitry to retrieve and execute software 410 from storage area 408. The hotspot prediction processing system 400 may further include other components such as a power management unit, a control interface unit, etc., which are omitted for clarity.

Communication interface 402 permits processing system 400 to communicate with other network elements. The communication interface 402 may include logic, circuitry, interface, and/or code operable to communicate with one or more devices, systems, databases, or any other devices that may be included in the environment 100. The communication interface 402 may implement one or more known technologies to support wired or wireless communication with the communication network 150. In embodiments of the invention, the communication interface 402 may be coupled to the I/O mechanism 404 through which the communication interface 402 may receive or transmit instructions, queries, speech signals or other information. The communication interface 402 may include, but is not limited to, an antenna, a radio frequency (RF) transceiver, one or more amplifiers, a tuner, one or more oscillators, a digital signal processor, a universal serial bus (USB) device, a coder-decoder (CODEC) chipset, a subscriber identity module (SIM) card, and/or a local buffer. The communication interface 402 may communicate via wireless communication with networks such as the Internet, an Intranet and/or wireless network, such as a cellular telephone network, a wireless local area network (LAN) and/or a metropolitan network (MAN).

I/O mechanism 404 permits the configuration and control of the operation of the hotspot prediction processing system 400. The I/O mechanism 404 may include multiple mechanisms for receiving speech input and generating output. The I/O mechanism 404 may comprise suitable logic, circuitry, interfaces, and/or code that may be configured to transmit or receive information to and from devices. The I/O mechanism 404 may be configured to communicate with the communication interface 402 and may be connected to the communication network 150 through the communication interface 402. The I/O mechanism 404 may further include an input terminal and an output terminal that may be realized through an antenna, and Ethernet port, a USB port, or any other type of port that may be configured to receive and transmit data. The I/O mechanism 404 may include, but is not limited to, a keyboard, a mouse, a joystick, a touch screen, a touch pad, a microphone, a camera, a motion sensor, and/or a light sensor. Further, the I/O mechanism 404 may include a display screen realized using suitable logic, circuitry, code, and/or interfaces that may be operable to display output. The display screen may be or include but is not limited to a liquid crystal display (LCD) display, light emitting diode (LED) display, or an organic LED (OLED) display.

Figure 5:
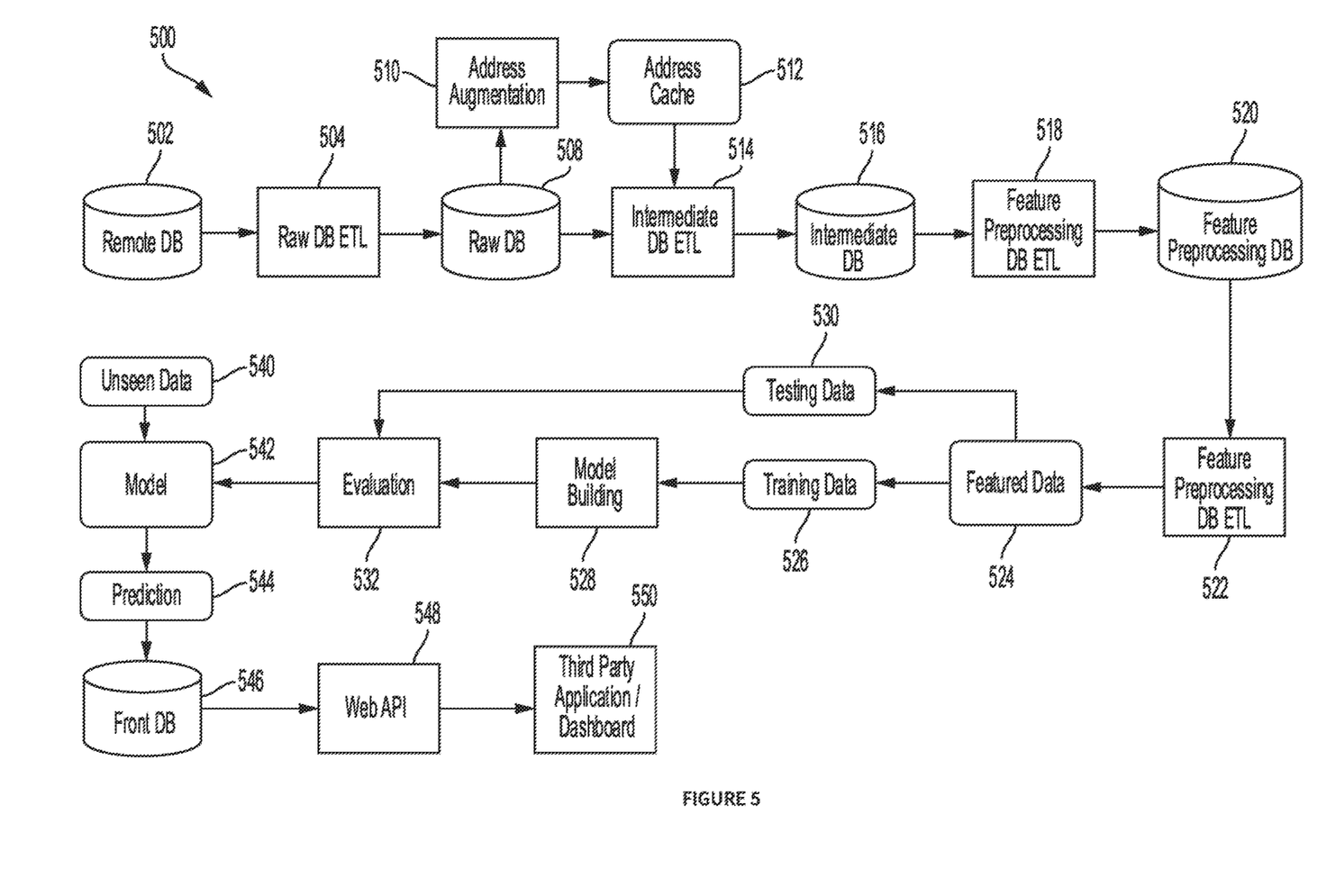
FIG. 5 is a workflow diagram illustrating augmented flow performed within the hotspot prediction system.

FIG. 5 is a flow diagram illustrating an exemplary flow within a backend system 500 of a hotspot prediction system implemented by the processor 406 of the hotspot prediction processing system 400. The system 500 may implement a remote database 502 for storing the data points collected from dispersed geographic locations. The processor may extract the historical crime data points collected from the remote database 502 and transfer them to a local raw database 508 using extract transform and load (ETL) steps at 504. The processor performs data preprocessing and data augmentation steps to improve the quality of the spatial information in steps 510 and 512, extracts the improved information using ETL procedures in step 514 and stores the improved information in an intermediate database 516. The one or more processors then extract the improved data from the intermediate database in step 518 using ETL procedures and perform feature preprocessing. Feature preprocessing includes performing temporal and spatial aggregation on the data to map locationID (or GridID) and timeID to the crime event data. The processor derives the aggregated crime count for each grid for every timeframe and in that way, converts the crime event data to crime count time series data at each grid level. The processor then stores the spatial and temporal aggregates in a feature preprocessing database 520.

The processor extracts the preprocessed data from the feature processing database in step 522 using ETL procedures and performs feature engineering to derive multiple statistical features from the aggregates to create feature data in step 524. The feature data is then split into training data 526 & testing data 530. The processor builds a crime volume bucket prediction model in step 528 using a Machine Learning (ML) algorithm (XGBoost™) & trains the model using training data 526. Subsequently, the built model is evaluated in step 532 using the testing data 530 set aside earlier. Based on the performance on testing data, model selection is done.

The selected model is then applied to the data including new or previously unseen data 540 in step 542 to formulate a hotspot prediction in step 544. The hotspot prediction is formulated using Algorithm1 and Algorithm2 explained above, with respect to calculating a hotspot probability measure and a hotspot score. The system may sort the hotspot scores in descending order and select the grids corresponding to the top N scores as predicted hotspots. The hotspot prediction is saved in a front database in step 546. A web API such as a REST API may be utilized in step 548 to extract the data from the front database for display on a dashboard in step 550. As further discussed below, the data may be displayed on a predictive GUI.

Various technologies may be utilized and implemented in the backend system. For example, a Python® tech stack, e.g., pandas™, numpy™, scipy™, scikit-learn™, and py-xgboost™ may be utilized for data engineering. The databases can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system. The frontend system including the front database 546, the web API 548, and the third party application/dashboard 550 may utilize a Python® tech stack, e.g., folium. DevOps® practices may utilize technologies such as git™ for version control and sublime™ for text workflow.

Figure 6:
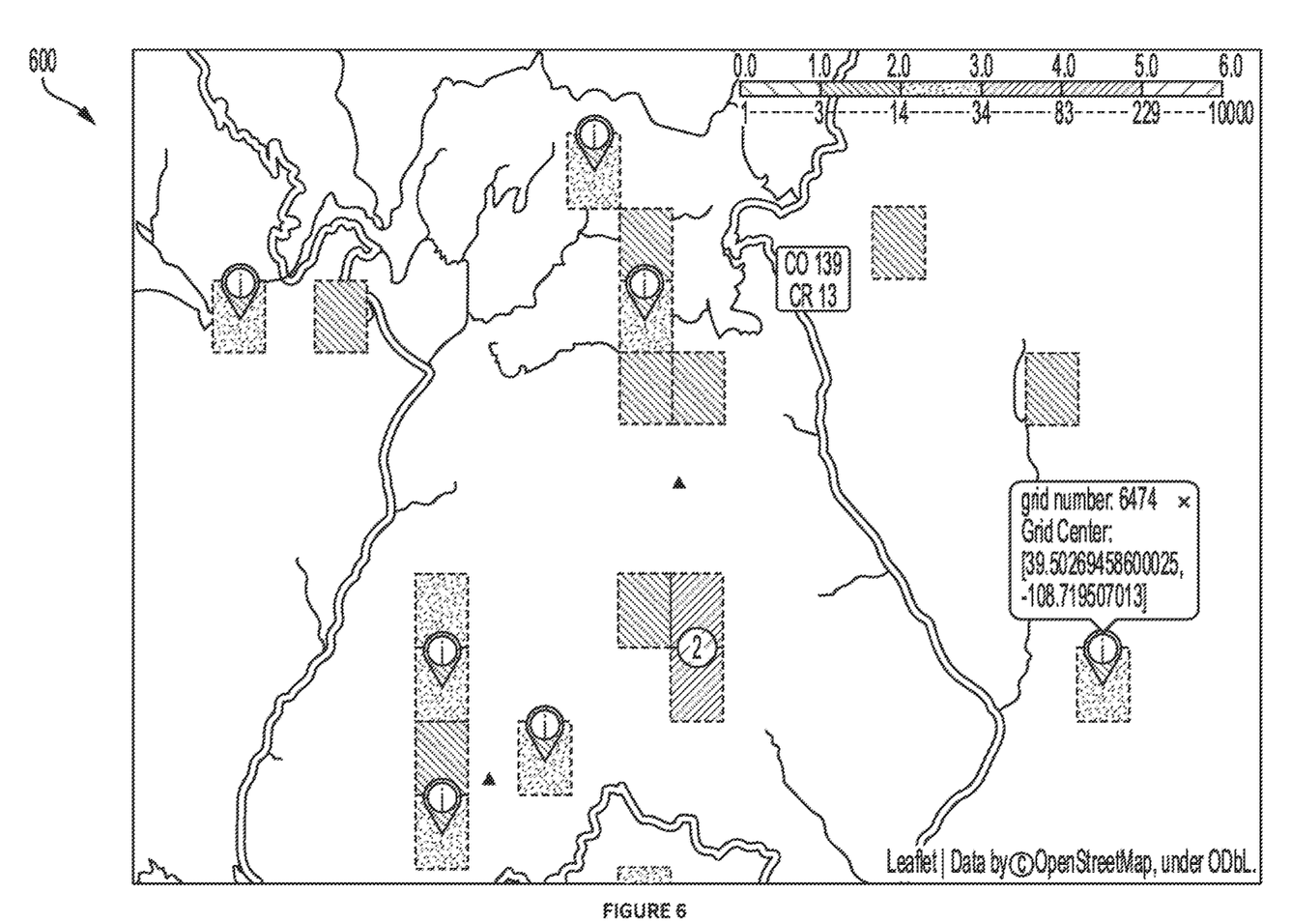
FIG. 6 illustrates a predictive GUI in accordance with an embodiment.

FIG. 6 illustrates a predictive hotspot GUI 600 in accordance with embodiments. In the displayed embodiment, the predictive hotspot GUI shows one month ahead hotspot prediction status of the grids formed in the region of interest (i.e., for the next month). The region of interest may be displayed as a map including highways, roads, etc. in the subject region. Grids may be color coded or otherwise marked with symbols based on the corresponding predicted crime volume bucket. The color of or symbol corresponding to each crime bucket with associated crime range is shown in the top right corner of the predictive hotspot GUI. In the displayed embodiment, each grid predicted as hotspot contains a balloon or icon in it and clicking on or selecting the balloon or icon results in a display of detailed spatial information of the particular grid. For example, the information may include a grid number and geographical coordinates of the grid center. The information may additionally include collected data pertaining to events that occurred in the grid over the past time period.

While the predictive hotspot GUI is extremely useful for law enforcement for purposes of resource allocation, the displayed results may also be directly connected to a resource allocation system to automatically dispatch resources to predicted hotspots. The resource allocation system may be utilized by LEA to dispatch resources in an automated manner.

Figure 7:
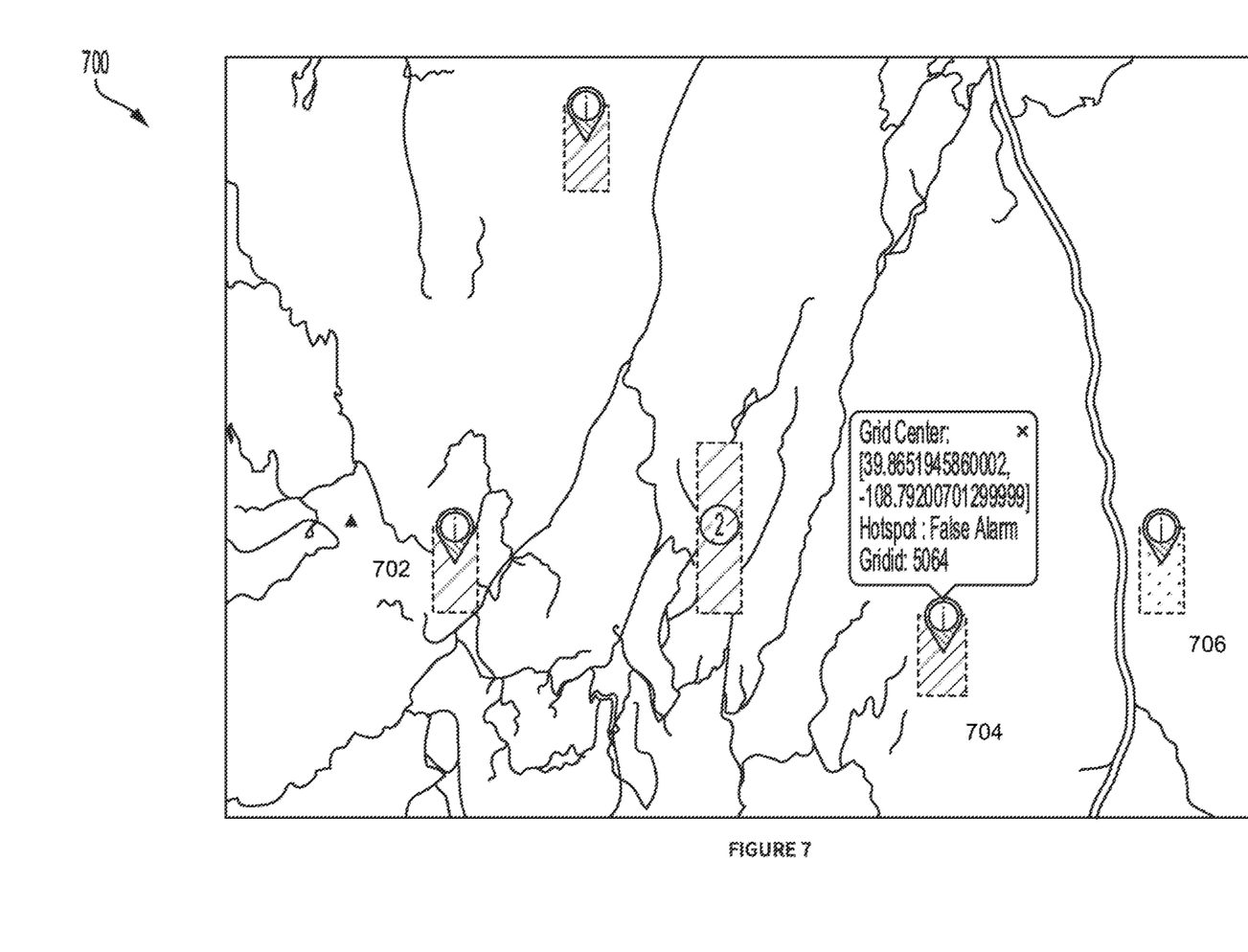
FIG. 7 illustrates a validation GUI in accordance with an embodiment.

FIG. 7 displays an embodiment of a hotspot validation GUI 700. The validation GUI shows the validation of the hotspot prediction for a previous time period against the ground truth for that time period. If a grid was predicted as hotspot and it is a true hotspot in the ground truth, then the grid is color coded as green or otherwise marked or displayed as a first display icon 702 indicating a valid hotspot. If a grid was predicted as hotspot, but in the ground truth, it is not a hotspot, then it marked as false alarm and color coded as yellow or otherwise displayed as a second display icon 704 that indicates a false alarm. If a grid was not predicted hotspot but in the ground truth, it is a hotspot, then it marked as missed hotspot and color coded as red or otherwise marked or displayed as a third display icon 706 indicative of a missed hotspot.

The system as proposed herein has been shown to have numerous advantages over pre-existing systems. An example provided below shows drawbacks of particular algorithms used within existing systems and the advantages of the embodiments disclosed herein.

The analysis assumes that three buckets are defined as Bucket1, Bucket2 and Bucket3 with crime range 1-5, 6-12 and 13-100 respectively and that the model is an ideal model with 100% classification accuracy. If two arbitrary grids (say Grid #A & Grid #B) have actual monthly crime counts of 9 and 12 respectively, predictive results may be obtained as follows:

| | Actual Crime Count | B1 probability | B2 probability | B3 probability | Predicted Bucket |
|---|---|---|---|---|---|
| Grid #A | 9 | 0.25 | 0.50 | 0.25 | B2 |
| Grid #B | 12 | 0.15 | 0.45 | 0.40 | B2 |

Both grids are correctly predicted in B2 by existing algorithms. Note that the actual occurrence count 9 lies in the middle of the Bucket 2 range, whereas 12 lies in the high end of the Bucket 2 range. Consequently, the probability of B3 for Grid #B assigned by the predictor is relatively higher than Grid #A. However, because the B2 probability of Grid #A is greater than that of Grid #B (i.e. 0.50>0.45)-Grid #A will get priority in terms of being selected as hotspot, although it has lower actual crime count than Grid #B. This example clearly shows the weakness of existing algorithms.

Approaches disclosed herein overcome this limitation. As set forth herein, a robust algorithm considers not only the predicted bucket and probability of belonging to that predicted bucket, but also the probability of belonging to buckets with an occurrence range greater than the predicted bucket.

Continuing with the example as set forth above with respect to the currently proposed solution, Grid #B has higher probability to belong to Bucket 3 than Grid #A, because 12 is closer to occurrence range of Bucket 3. Similarly, Grid #A has higher probability to belong to Bucket 1 than Grid #B. So, the sum of probability to belong to Bucket 2 and Bucket 3 will be higher for Grid #B (0.45+0.40=0.85) than Grid #A (0.5+0.25=0.75). As a result, Grid #B gets priority for being selected as a hotspot. Accordingly, whereas previous algorithms would likely have generated a false alarm or resulted in a missed hotspot, the currently proposed approach is likely to result in correct hotspot selection.

Further, the proposed system has been shown to lift metrics of precision/recall by a significant margin (5% on average). While the system is described in the context of crime prediction, it has wide applicability to other areas such as transportation and logistics.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed:

1. A method for dynamically predicting hotspots having a high volume of crime in a geographic location and generating a corresponding alert, the method comprising:
    an implementation on a server that includes at least one processor for performing the steps including,
    collecting raw occurrence data representing event occurrences within a preselected geographical area;
    performing spatial aggregation to map the collected raw occurrence data to multiple grids within the pre-selected geographical area;
    deriving aggregated data over a time period for the grids based on the mapped raw occurrence data, the aggregated data including an aggregated event count;
    building a data driven volume predictive model, where volume data is grouped into a number of pre-defined buckets, such that each pre-defined bucket represents a range of volumes with a lowest pre-defined bucket representing lowest volumes to a highest pre-defined bucket representing highest volumes, and for each grid, a corresponding probability of each bucket is determined based on the aggregated event count and a predictive volume is chosen as a highest probability bucket;
    calculating a hotspot probability measure for each grid by summing the probability of the highest probability bucket with probabilities of all higher pre-defined buckets;
    calculating a hotspot score for each grid based on the corresponding hotspot probability measure and a predicted bucket weight;
    selecting a predetermined N number of grids having the highest hotspot score as predicted hotspot; and
    generating an alert indicating the predicted hotspots and displaying the alert on a predictive GUI showing the multiple grids.

2. The method of claim 1, further comprising performing the step of sorting the grids in descending order of realized crime volume for a given time window and selecting N number of top grids as true hotspots.

3. The method of claim 1, further comprising displaying an evaluation of predictive accuracy.

4. The method of claim 3, further comprising generating a validation GUI through comparison of the predicted hotspots and data collected during a prediction timeframe.

5. The method of claim 4, further comprising generating the validation GUI by creating a first display icon for accurately predicted hotspots, a second display icon for falsely predicted hotspots and a third display icon for unpredicted hotspots and displaying the icons within the pre-selected geographical area.

6. The method of claim 2, further comprising storing the generated alerts in a front database.

7. The method of claim 6, further comprising utilizing a REST API to retrieve and display the generated alerts on a hotspot dashboard of the predictive GUI.

8. The method of claim 1, wherein calculating the hotspot score comprises summing a predicted bucket weight with the hotspot probability measure.

9. The method of claim 1, further comprising collecting the raw occurrence data from a remote database using ETL steps.

10. A system for dynamically predicting hotspots of an event in a geographic location and generating corresponding alerts, the system comprising:
    a communication interface configured to collect raw occurrence data from a remote database using ETL steps; and
    a server including at least one processor and a memory storing instructions for execution by the processor for performing steps including,
    performing spatial aggregation to map the collected raw occurrence data to multiple grids within the pre-selected geographical area;
    deriving aggregated data over a time period for the grids based on the mapped raw occurrence data, the aggregated data including an aggregated event count;
    implementing a data driven volume predictive model, where volume data is grouped into a number of pre-defined buckets, such that each pre-defined bucket represents a range of volumes with a lowest pre-defined bucket representing lowest volumes to a highest pre-defined bucket representing highest volumes, and for each grid, determining a corresponding probability of each bucket based on the aggregated event count and selecting a predictive volume as a highest probability bucket;
    calculating a hotspot probability measure for each grid by summing the probability of the highest probability bucket with probabilities of all higher pre-defined buckets;
    calculating a hotspot score for each grid based on the corresponding hotspot probability measure and a predicted bucket weight;

selecting a predetermined N number of grids having the highest hotspot score as predicted hotspot; and generating an alert indicating the predicted hotspot and a display interface displaying the alert on a predictive GUI showing the multiple grids.

11. The system of claim 10, wherein the processor further performs the step of sorting the grids in descending order of realized event volume for a given time window and selects a predetermined N number of top grids as true hotspots.

12. The system of claim 10, further comprising providing an evaluation of predictive accuracy.

13. The system of claim 12, wherein the processor generates a validation GUI through comparison of the predicted hotspots and data collected during a prediction timeframe.

14. The system of claim 13, wherein the validation GUI comprises a first display icon representing accurately predicted hotspots, a second display icon representing falsely predicted hotspots and a third display icon for unpredicted hotspots, wherein the icons are displayed within the preselected geographical area.

15. The system of claim 11, further comprising a front database storing the generated alerts.

16. The system of claim 15, further comprising a REST API for retrieving and displaying the generated alerts on a hotspot dashboard of the predictive GUI.

17. The system of claim 10, wherein calculating the hotspot score comprises summing a predicted bucket weight with the hotspot probability measure.

18. The system of claim 10, wherein the predicted hotspot predicts a high volume of an event in a particular geographic location during a prediction timeframe.

19. A non-transitory computer readable medium storing instructions for execution by a processor, wherein the instructions upon execution cause the processor to perform steps including:

collecting raw occurrence data representing event occurrences within a preselected geographical area;

performing spatial aggregation to map the collected raw occurrence data to multiple grids within the pre-selected geographical area;

deriving aggregated data over a time period for the grids based on the mapped raw occurrence data, the aggregated data including an aggregated event count;

building a data driven volume predictive model, where volume data is grouped into a number of pre-defined buckets, such that each pre-defined bucket represents a range of volumes with a lowest pre-defined bucket representing lowest volumes to a highest pre-defined bucket representing highest volumes, and for each grid, determining a corresponding probability of each bucket based on the aggregated event count and selecting the predictive volume as a highest probability bucket;

calculating a hotspot probability measure for each grid by summing the probability of the highest probability bucket with probabilities of all higher pre-defined buckets;

calculating a hotspot score for each grid based on the corresponding hotspot probability measure and a predicted bucket weight;

selecting a predetermined N number of grids having the highest hotspot score as predicted hotspots; and generating an alert indicating the predicted hotspots and displaying the alert on a predictive GUI showing the multiple grids.

20. The computer readable medium of claim 19, wherein the instructions further cause the processor to sort the grids in descending order of realized event volume for a given time window and select a predetermined N number of top grids as true hotspots.

* * * * *